(12) United States Patent
Wang et al.

(10) Patent No.: US 8,506,144 B2
(45) Date of Patent: Aug. 13, 2013

(54) CAR LIGHTING UNIT FOR GENERATING A BEAM OF LIGHT AND A HOLOGRAPHIC 3D IMAGE

(75) Inventors: Lingli Wang, Bad Kreuznach (DE); Augustinus Gregorius Henricus Meijers, Eindhoven (NL); Nils Benter, Aachen (DE); Ludo Haenen, Eindhoven (NL); Matthias Daniel Epmeier, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 574 days.

(21) Appl. No.: 12/597,512

(22) PCT Filed: Apr. 25, 2008

(86) PCT No.: PCT/IB2008/051598
§ 371 (c)(1),
(2), (4) Date: Feb. 23, 2010

(87) PCT Pub. No.: WO2008/132678
PCT Pub. Date: Nov. 6, 2008

(65) Prior Publication Data
US 2010/0214797 A1    Aug. 26, 2010

(30) Foreign Application Priority Data
May 1, 2007    (EP) ..................................... 07107283

(51) Int. Cl.
*F21V 5/00*    (2006.01)
(52) U.S. Cl.
USPC ....................................................... 362/520

(58) Field of Classification Search
USPC .................................................. 362/520–522
See application file for complete search history.

(56) References Cited

U.S. PATENT DOCUMENTS

| 4,722,037 | A |   | 1/1988  | Davis |
|-----------|---|---|---------|-------|
| 5,455,747 | A | * | 10/1995 | Aoyama ...................... 362/545 |
| 5,497,251 | A |   | 3/1996  | Wreede et al. |
| 5,571,277 | A |   | 11/1996 | Allred et al. |
| 5,708,519 | A |   | 1/1998  | Yamamoto et al. |
| 6,163,390 | A | * | 12/2000 | Kanda et al. ..................... 359/28 |
| 2006/0171008 | A1 | * | 8/2006 | Mintz et al. ..................... 359/15 |

FOREIGN PATENT DOCUMENTS

| DE | 4421306 A1 | 1/1995 |
| EP | 0452815 A1 | 10/1991 |
| JP | 04228329   | 8/1992 |
| JP | 06305360   | 1/1994 |
| JP | 09185906   | 7/1997 |
| JP | 10031909   | 2/1998 |

OTHER PUBLICATIONS

English Translation of JP 4228329 A; Aug. 18, 1992 via Espacenet.*

* cited by examiner

*Primary Examiner* — Anh Mai
*Assistant Examiner* — Hana Featherly

(57) ABSTRACT

The invention provides a car lighting unit (1) comprising a reflector (10) and a light source (20) arranged to generate light (21). The reflector (10) circumferentially surrounds the light source and the reflector has a reflector opening (11). The reflector is arranged to reflect at least part of the light from the light source through the reflector opening. The car lighting unit further comprises a 3D hologram (30). The car lighting unit is constructed to generate a beam of light (22) and a holographic 3D image (31), using light from the light source (20).

10 Claims, 3 Drawing Sheets

CAR LIGHTING UNIT FOR GENERATING A BEAM OF LIGHT AND A HOLOGRAPHIC 3D IMAGE

FIELD OF THE INVENTION

The present invention relates to a car lighting unit comprising a reflector and a light source, and the car lighting unit further comprising a hologram. The invention further relates to the use of a hologram in car lighting.

BACKGROUND OF THE INVENTION

The use of holograms in lighting applications is known in the art. U.S. Pat. No. 5,497,251 for instance discloses a hologram structure for use in a holographic center high mounted stoplight system for a vehicle. The hologram structure includes an illumination source for providing a reconstruction beam, a first array of non-overlapping hologram cells and non-hologram cells, and a second array of non-overlapping hologram and non-hologram cells. Each hologram cell of the first array produces a specular image that is viewable in a first predetermined angular field pursuant to diffraction of a portion of the reconstruction beam, and each hologram cell of the second array produces a diffuse image that is viewable in a second predetermined angular field pursuant to diffraction of a portion of the reconstruction beam. The specular images and diffuse images produced by the first and second holograms form stoplight illumination. In this way, a stop light should be provided that has an output having an appearance that is similar to the lenticulated output of a conventional head light.

U.S. Pat. No. 4,722,037 discloses an optical assembly for providing illumination comprising (a) a first artificial light source providing light at a first wavelength, (b) a second artificial light source providing light at a second wavelength different from said first wavelength, and (c) a holographic optical element adapted to diffract light of said first and second wavelengths in different beam patterns, and positioned such that light from said first and second light sources is diffracted in said different beam patterns to provide illumination of two different regions in space. The optical assemblies according to U.S. Pat. No. 4,722,037 should provide an improved efficiency and reduced glare by producing multiple beam patterns, using a plurality of light sources of different spectral characteristics, and a holographic optical element adapted to diffract light from the two light sources into different beam patterns. The optical assemblies according to U.S. Pat. No. 4,722,037 should be useful as automobile headlights to produce high or low beam illumination of the roadway, depending on which light source is turned on.

U.S. Pat. No. 5,571,277 discloses an automotive signal lamp comprising a first light providing a source of illumination, a tinted lens receiving the illumination by the first light source on a first side of the lens, the lens tinting the illumination given by the first light source to a first desired frequency, a transmissive hologram adjacent the lens for providing a first image only when the first light source is actuated, the transmissive hologram being activated by light at the first desired frequency, and a reflective hologram adjacent the transmissive hologram for providing an image differing from the first image, the second image being visible only when the first light source is not actuated and when the lens is illuminated by a second light source on a side of the lens generally opposite the first light source.

SUMMARY OF THE INVENTION

Those prior art lamps have one or more of the drawbacks that they are not suitable to generate a beam of light according to the prescribed specifications, which is used for illumination or signaling (i.e. light signaling function), while simultaneously also generating a holographic 3D image, which can be used for instance to provide information.

It is an object of the invention to provide an alternative car lighting unit, which preferably further obviates the above-described drawback.

According to a first aspect of the invention, there is provided a car lighting unit comprising a reflector and a light source arranged to generate light, wherein the reflector circumferentially surrounds the light source and has a reflector opening, the reflector being arranged to reflect at least part of the light from the light source through the reflector opening, the car lighting unit further comprising a 3D hologram and the car lighting unit being constructed to generate a beam of light and a holographic 3D image by light from the light source. Herein, the light source that is arranged and used to generate the beam is also used to generate the 3D holographic image; there are no separate light sources to generate the beam and the 3D holographic image, respectively.

Advantageously, part of the light from the light source illuminates the hologram to generate a virtual or a real holographic 3D image (e.g. logo, car brand); the features of the hologram and holographic image per se are not for signaling, although they are of course part of the signal. Another part of the light from the light source will be reflected by a reflector for signaling. In this way, one lamp (lighting unit) can be applied to generate simultaneously the holographic 3D image and the required beam of light, which beam of light may fully comply with the specification for its specific signaling purpose. Preferably, the lighting unit is constructed to provide a signal function (signaling), not an illumination function (illumination). Hence, preferably, the car lighting unit is designed to provide a light signaling function (signaling lighting devices). Characteristic examples of such lighting units are stop lamps, direction indicators, rear lamps, etc. For automotive applications, signaling lighting is usually indicated in candela (cd) (luminous intensity), whereas for lighting this is usually indicated in lux (lx) (illuminance) and sometimes in candela (e.g. the new Front Fog application), as known to the person skilled in the art.

The reflector and, in an embodiment, also an optional (transmissive) optical element (see below) are arranged to shape the beam of the lighting unit, i.e., the reflector and the optionally (transmissive) optical element are beam shaping elements. In contrast, the hologram is substantially not arranged to shape the beam, but is essentially arranged to provide the 3D holographic image in addition to the beam of light, the latter, and more preferably the whole beam including the holographic 3D image, preferably fulfilling the required specifications for the intended use of the lighting unit, such as stop light, fog light, etc. (see also below). Hence, the lighting unit according to a preferred embodiment of the invention has the functionality of providing at the same time a beam according to the required specifications, such as for stop lamps or direction indicator, etc., and a holographic image, which is additional to the beam. More preferably, the lighting unit according to a preferred embodiment of the invention has the functionality of providing at the same time a beam according to the required specifications, such as for stop lamps or direction indicator, etc., and a holographic image, which is additional to the beam, said lighting unit being constructed to provide the beam including the 3D holographic image (preferably the 3D holographic image is within the prescribed beam) according to the prescribed specifications (especially according to one or more of the regulations mentioned herein)

In a specific embodiment, the reflector opening has a reflector opening area (which may optionally comprise an optical element) and the 3D hologram has a hologram surface area, and the ratio of the reflector opening area to the hologram surface area is $\geq 1$, preferably $\geq 2$, more preferably $\geq 4$, such as in the range of about 1-10, preferably in the range of about 2-10, more preferably in the range of about 4-10. Especially under these conditions, the lighting unit is suitable for generating the specified beam of light and simultaneously the holographic 3D image. Preferably, during use of the lighting unit, the ratio of the luminous intensity related to the holographic 3D image relative to the total luminous intensity (i.e. luminous intensity in beam including 3D holographic image) is in the range of about 0.002-0.3, more preferably in the range of about 0.01-0.1.

The car lighting unit may be selected from the group consisting of rear direction indicator lamps, front direction indicator lamps, side direction indicator lamps (side turn signal lamps), stop lamps, front position (side) lamps, rear position (side) lamps (tail lamps), end-outline marker lamps, rear fog lamps (fog tail lamps), CHMSL (Center High Mounted Stop Lamp), HMSL (High Mounted Stop Lamps (rear turn lamps)), DRL (Daytime Running Lights), reversing lamps (backup lamps) and parking lamps. The light source may comprise one or more light sources selected from the group consisting of LEDs (Light emitting devices), OLEDs (including for instance polyLEDs and single molecule OLEDs), filament light sources, such as incandescent lamps and halogen lamps, and gas-discharge light sources, such as high intensity discharge lamps. Preferably, the light source comprises one or more light sources selected from the group consisting of LEDs (such as for instance top-LEDs and/or side-LEDs) and incandescent lamps.

In a preferred embodiment, the car lighting unit according to the invention is constructed to generate the holographic 3D image within a distance from the reflector opening in the range of about 0-5 m. Preferably, the distance is in the range of about 0-2 m, more preferably in the range of about 0-0.5 m, more preferably in the range of about 0-0.1 m. In this way, the holographic 3D image is substantially not blended by the beam of light from the lighting unit and is visible for an observer, such as another road user. Further, in this way other users of the road will both see the lighting unit (i.e. especially its signal) and the holographic image at the same time and substantially at the same position.

In a specific embodiment, the 3D hologram is a transmissive hologram. In another specific embodiment, the 3D hologram is a reflective hologram. The 3D holographic image may contain information, such as one or more symbols or one or more letters, words, abbreviations etc. or combinations thereof, or may contain graphic representations, patterns or objects. Also combinations of such contents may be used. For instance, the image may be a 3D image of the logo of the brand of the car and/or the type of the car, but the image may also represent information like arrows (for instance for a lighting unit for use as direction indicator) or words like brand names or warning information, etc. Hence, the invention therefore provides the possibility to add information etc. to beams of lighting units ("lamps") of cars (or other vehicles).

The reflector has a reflector surface which is arranged to reflect at least part of the light generated by the light source. In principle, lighting units not having a reflector can be applied and are considered to be incorporated herein as well, but, preferably, the lighting unit according to the invention comprises such a reflector. The presence of a reflector allows beam shaping. Further, the invention is also directed to light guide collimators or other kinds of collimating optics. Such optics can be used to collimate the light to a reflector opening (for instance a fiber tip).

In an embodiment, the 3D hologram is arranged on the reflector surface. In this embodiment, the hologram may be reflective or transmissive. In another embodiment, the reflector opening comprises an optical element, preferably a transmissive optical element, and the 3D hologram may be arranged on the preferably transmissive optical element. In embodiments wherein a transmissive optical element is applied, the 3D hologram will in general also be transmissive.

In a specific embodiment, the 3D hologram is a dynamical hologram. This advantageously provides the possibility to provide information, such as commercial-like information about the brand and/or type, etc. (see also above), which information may change with time. For instance, the holographic image may be projected with a (predetermined) frequency, or different information may be provided alternatingly. The contents of the 3D holographic image may be variable by the driver, crew or a passenger, but may optionally also be a function of sensor signals, such as the distance between the car having such a lighting unit and a next car behind or in front of the car having said lighting unit, which sensor signals are provided by one or more distance sensors.

In an embodiment, the car lighting unit is constructed to generate the holographic image within the beam of light, i.e. the light source, reflector and hologram are arranged to generate a beam of light within specific angles (according to regulations with respect to the specific lighting unit) and the holographic image is also found within these angles. In an alternative embodiment, the holographic image may also be generated outside the beam of light, or at least partially outside the beam of light.

For instance, the holographic image may be visible within the specifications for the beam shape (i.e. beam specs) belonging to the beam of the lighting unit. For instance, the beam shape of a stop light is regulated according to SAE J 586 for native America, in ECE regulation 7 for Europe and in JSD 5500 for Japan. The holographic image may preferably be found within the beam defined by such a regulation (depending upon the regulation which is intended to be complied with), but may also be found in another embodiment outside such a beam. Preferably, however, the 3D holographic is within the beam, as specified for the specific lamp (vide infra) and preferably also projected close to the reflector opening (i.e. within 5 m). In this way, at the same time (and in substantially the same position) other road users will see both the signaling light and its accompanying 3D holographic image according to the invention.

According to yet another aspect, the invention provides the use of a 3D hologram for adding a holographic 3D image to a beam of light of a car lighting unit during operation of the car lighting unit. For instance, one may arrange a transmissive optical element comprising the 3D hologram to the lighting unit, or one may attach a 3D hologram to an existing transmissive optical element. Advantageously, the invention provides such use while maintaining the required specification for the beam of light. This will especially be the case when the ratio of the reflector opening area to the hologram surface area is $\geq 1$. In a further embodiment, the invention provides the use of 3D hologram for generating the holographic 3D image within a distance from the reflector opening, which distance is in the range of about 0-5 m.

Advantageously, while fulfilling the required beam specs for the lamp (lighting unit), additionally to the beam, a 3D holographic image is generated by the lamp (lighting unit). This 3D holographic image may contain any information desired, such as a logo, a brand name, a figure, etc. Further, the information content may change with time and/or may be determined by one or more of the driver (or crew), the optional passengers and optional sensors (dynamic hologram).

BRIEF DESCRIPTION OF THE DRAWINGS

Embodiments of the invention will now be described, by way of example only, with reference to the accompanying schematic drawings in which corresponding reference symbols indicate corresponding parts.

DETAILED DESCRIPTION OF THE EMBODIMENTS

Figure 1:
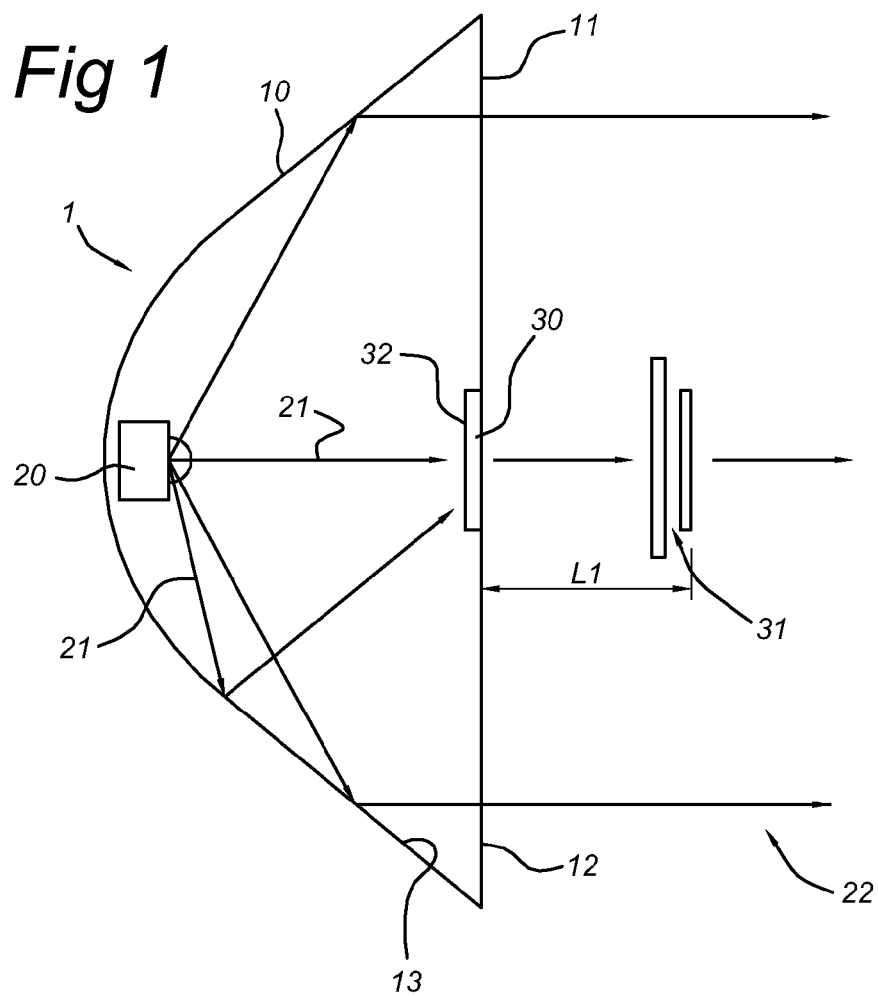
FIG. 1 schematically depicts in side view an embodiment of the lighting unit according to the invention.

FIG. 1 schematically depicts in side view a car lighting unit or device 1 according to the invention. Peripheral equipment such as a source, a lamp holder, connectors, ballasts, optional sensors, etc, are not included in the schematic drawing(s) for the sake of understanding. The lighting unit 1 comprises a reflector 10 and a light source 20 arranged to generate light 21. During use of the lighting unit 1, light source 20 generates light and the lighting units provide a beam 22. As known in the art, the reflector 10 circumferentially surrounds the light source 20. In this schematically depicted embodiment, the reflector is a tapered body with a reflector opening 11 and the reflector 10 is arranged to reflect at least part of the light 21 from the light source 20 through the reflector opening 11. For instance, the reflector 10 may also be used as a collimator. Reflectors like these are known in the art. The reflector 10 is not necessarily centro-symmetrical, but may have any tapered form. Such reflector-lamp units are known in the art. For instance, the reflector may also have an elongated shape.

As mentioned above, in principle, lighting units 1 not having a reflector can be applied and are also enclosed herein, in an embodiment, but preferably, the lighting unit 1 according to the invention comprises such a reflector 10. The presence of a reflector allows beam shaping. Further, the invention is also directed to light guide collimators or other kinds of collimating optics. Such optics can be used to collimate the light to a reflector opening 11, and within the light guide, light is reflected in the direction of the reflector opening 11 (i.e. the end ("tip") of the light guide where light exits the light guide). In such embodiments, the hologram 30 may be arranged on the tip, or on optics in front of or attached to the tip, etc., as will be clear to the person skilled in the art.

The car lighting unit 1 further comprises a 3D hologram 30. As mentioned above, this may be any 3D hologram for generating any 3D holographic image, such as logos, brand names, information on for instance distance to the next car behind the car having said lighting unit 1, etc. The car lighting unit 1 is constructed to generate the beam of light 22 and a holographic 3D image 31 by light 21 from the light source 20.

Hence, unlike prior art lamps, the 3D hologram is not applied to generate the beam 22, but is essentially used to generate the 3D holographic image 31, said beam 22 being generated by light source 20 and reflector 10. Herein, the terms "constructed", "assembled" and "designed" especially refer to the lighting unit 1 which has a specific reflector 10 and a specific light source 20, which together provide a lighting unit 1 for use as a lamp in a vehicle, especially a signaling lamp, preferably according to at least one of the regulations mentioned herein (vide infra), the lamp being designed and constructed for its purpose.

The term "lighting unit" can also be understood to mean lamp. In some embodiments, the light source and reflector may be a single unit, in other embodiments, the light source 20 and reflector 10 may be easily detachable, for instance since the light source 20 and reflector 10 are held together by movable physical attachment means such as screws and screw thread or a (movable) catch, as known to the person skilled in the art. As a unit, the lighting unit 1 may be integrated in a car and be commercially available as such. The light source 20 may (also) be a replaceable light source.

The term "car" herein especially refers to automobiles, but may in an embodiment also refer to a vehicle selected from the group consisting of automobiles, vans, trucks (lorries) and busses. In an embodiment, it also includes their trailers. In yet another embodiment, the term "car" may also refer to a vehicle selected from the group consisting of automobiles, vans, motorcaravans, trucks (lorries), busses, trailers, mobile homes, etc. However, in an embodiment, the term "car" may also refer to any other motor vehicle that is allowed on public roads, such as tractors, motor trikes, quads, motor skelters, etc. However, the lighting unit 1 according to the invention may also be applied in motorbikes (motor cycles), mopeds, trains, planes, and even ships, vessels, boats, etc. Hence, in an embodiment, the term "car" may also be interpreted as vehicle.

Preferably, the car lighting unit is designed to provide a signaling function, i.e. to emit a light signal to other road users (temporarily or permanently). This means that the light source 10 and the reflector 20, i.e. the lighting unit 1, and optionally other components, are chosen and assembled to provide, during use in a car, a signaling function (at least temporarily, such as during direction indicating, reversing or stopping).

The car lighting unit 1 according to the invention may be selected from the group consisting of rear direction indicator lamps, front direction indicator lamps, side direction indicator lamps (side turn signal lamps), stop lamps, front position (side) lamps, rear position (side) lamps (tail lamps), end-outline marker lamps, rear fog lamps (fog tail lamps), CHMSL (Center High Mounted Stop Lamps), HMSL (High Mounted Stop Lamps (rear turn lamps)), DRL (Day Time Running lights), reversing lamps (backup lamps), and parking lamps, and is especially selected from the group consisting of stop lamps, indicator lamps (such as rear, front and side direction indicator lamps), rear fog lamps, high mounted stop lamps (CHMSL and HMSL) and day time running lights.

Herein, according to ECE Regulation 48: "direction indicator lamp" means the lamp used to indicate to other road users that the driver intends to change direction to the right or to the left; a "stop lamp" means a lamp used to indicate to other road users to the rear of the vehicle that the longitudinal movement of the vehicle is intentionally retarded; a "front position lamp" means the lamp used to indicate the presence and the width of the vehicle when viewed from the front; a "rear position lamp" means the lamp used to indicate the presence and width of the vehicle when viewed from the rear;

"hazard warning signal" means the simultaneous operation of all of a vehicle's direction indicator lamps to show that the vehicle temporarily constitutes a special danger to other road users; "rear fog lamp" means a lamp used to make the vehicle more easily visible from the rear in dense fog; "reversing lamp" means the lamp used to illuminate the road to the rear of the vehicle and to warn other road users that the vehicle is reversing or about to reverse; "parking lamp" means a lamp which is used to draw attention to the presence of a stationary vehicle in a built up area. In such circumstances it replaces the front and rear position lamps; "end outline marker lamp" means the lamp fitted near to the extreme outer edge and as close as possible to the top of the vehicle and intended to indicate clearly the vehicle's overall width. This lamp is intended, for certain vehicles and trailers, to complement the vehicle's front and rear position lamps by drawing particular attention to its bulk; "side marker lamp" means a lamp used to indicate the presence of the vehicle when viewed from the side; and "daytime running lamp" means a lamp facing in a forward direction used to make the vehicle more easily visible when driving during the daytime.

Such lighting units preferably fulfill the beam requirements for lamps such as for instance found in SAE J 186, SAE J 585, SAE J 586, SAE J 588, SAE J 593, SAE J 599, SAE J 914, SAE J 1319, SAE J 1957 and SAE J 2087 for native America (i.e. USA and Canada), in ECE regulations 6, 7, 23, 38, 48, 77 and 87 for Europe and in JIS D 5500 for Japan, which are incorporated herein by reference; see also table 1.

The ECE regulations are part of the "Agreement concerning the adoption of uniform technical prescriptions for wheeled vehicles, equipment and parts which can be fitted and/or be used on wheeled vehicles and the conditions for reciprocal recognition of approvals granted on the basis of these prescriptions" (including corrigendums, amendments and addendums to these ECE Regulations) of the United Nations Economic Commission for Europe (UNECE), also known as E/ECE/324 E/ECE/TRANS/505, which are known to the person skilled in the art, and which can be found at http://www.unece.org/. These regulations (including corrigendums, amendments and addendums to these ECE Regulations) are herein incorporated by reference. The lighting unit of the invention preferably fulfils the requirements (specifications) for at least one type of lamp described in the above mentioned requirements.

Herein, the notation "light source 20" also indicates "at least one light source 20". Hence, the terms "at least one light source 20" or "light source 20" refer to one or more light sources 20. For the sake of simplicity, the drawings herein only show one light source 20. The light source 20 may comprise one or more light sources selected from the group consisting of LEDs, filament light sources such as incandescent lamps and halogen lamps and gas-discharge light sources such as high intensity discharge lamps. Preferably, the reflector 10 contains or circumferentially surrounds only one light source 20, i.e. one single lamp or one single LED.

The term "light" herein especially refers to visible radiation (VIS), i.e. radiation in the range of about 380-780 nm. When the light source 20 comprises more than one light source 20, such as a plurality of LEDs, the respective light sources 20 may generate radiation of different colors. For instance, as light source 20 a set of blue, green and red LEDs may be used, but also a plurality of monochromatic light sources 20 may be used, such as an array of (red light emitting) LEDs.

The terms "hologram" and "holographic image" are known in the art and refer to the intermediate photograph (or photographic record) that contains information for reproducing a three-dimensional image (representation) and the image (representation) itself. The term "hologram" and "holographic image" may also refer to a plurality of holograms and holographic images. The term "3D hologram", for brevity also indicated as "hologram" herein, refers to holograms that are designed to generate 3D images (for brevity indicated as "image"). Herein, the "3D holographic image" is also indicated as "holographic image" or "image".

As can be seen in FIG. 1, the light source 20 generates light 21, which may at least partly be reflected on a reflecting surface 13 of reflector 10. The light source 20 and the reflector 10 allow the lighting unit 1 to generate the beam of light 22 from light 21 originating from the light source 20. In addition, due to the presence of 3D hologram 30, part of light 21 from the light source 20 is used to generate the 3D holographic image 31. By way of example, a few rings are schematically depicted as 3D holographic image 31 (vide infra).

The reflector opening 11 has a reflector opening area 12 and the 3D hologram 30 has a hologram surface area 32. In a preferred embodiment, the ratio of the reflector opening area 12 to the hologram surface area 32 is $\geq 1$. Especially under this condition the lighting unit 1 is suitable for generating the specified beam of light 22 and simultaneously the holographic 3D image 31. Preferably, the ratio of the reflector opening area 12 to the hologram surface area 32 is in the range of about 2-20, more preferably in the range of about 2-10, even more preferably in the range of about 4-10.

In a preferred embodiment, during use of the lighting unit 1, the ratio of the luminous intensity related to the holographic 3D image 31 relative to the total luminous intensity is in the range of about 0.002-0.3, more preferably in the range of about 0.01-0.1. Hence, in a preferred embodiment, the lighting unit is designed and constructed to generate, during use, light of which the ratio of the luminous intensity related to the holographic 3D image 31 relative to the total luminous intensity is in the range of about 0.002-0.3, more preferably in the range of about 0.01-0.1. In a specific embodiment, at least 5% of the total luminous flux of the light generated by the light source 20 is used by hologram 30 to create a holographic image 31 during use of the lighting unit 1. Preferably, the holographic image 31 has a luminous intensity of about 0.04-100 cd. Further, specific preferred embodiments are indicated in table 1. As mentioned above, the lighting unit 1 preferably fulfils the requirements of at least one type of lamps of which the specifications are regulated in one or more of the above-mentioned regulations. Hence, preferably the whole lighting unit 1, i.e. the arrangement of light source 20 and reflector 10, is in conformity with at least one of the regulation specifications; and preferably the lighting unit 1 produces, during use, a beam including a 3D holographic image, of which the luminous intensities and angular distributions are according to the specifications laid down in one or more of the regulations mentioned herein.

FIG. 1 schematically shows beam 22, which is the beam generated by the light source 20 and shaped, at least partially, by reflector 10 with reflective surface 13, and hologram 31 within a distance L1. In a preferred embodiment, the car lighting unit 1 is constructed to generate the holographic 3D image 31 within a distance L1 from the reflector opening 11 in the range of about 0-5 m, preferably about 0-0.5 m, even more preferably in the range of about 0-0.1 m. Here, the distance L1 is the shortest distance from the opening 11 of the reflector 10 to a part of the holographic image 31 that is furthest away from source 20 or reflector opening 11.

In FIGS. 2a-2d, a non-limiting number of possible embodiments of the lighting unit 1 according to the invention are depicted.

Figure 2A:
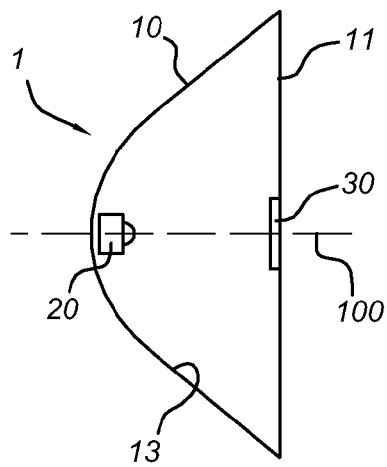
FIGS. 2a-d schematically depict in side view a number of embodiments of the lighting unit according to the invention.
Figure 2B:
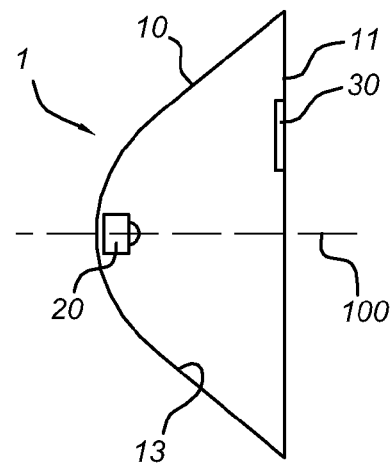
Figure 2C:
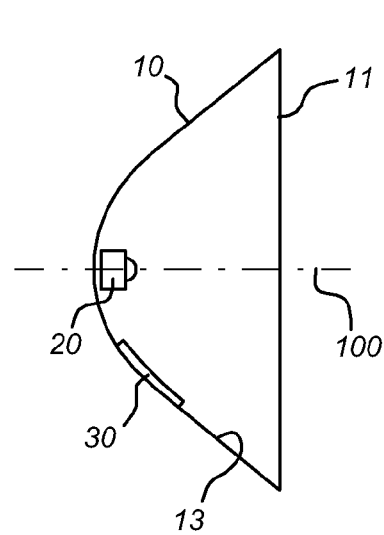

For instance, like in FIG. 1, FIG. 2a shows a transmissive hologram 30, which is aligned "on axis". FIGS. 2a-2c show an axis 100, which, in circularly symmetric reflectors 11, is a longitudinal axis. It especially refers to the reference axes or 0°, 0° axes as used in the abovementioned regulations, see for instance ECE Regulation No 6, page 18, Figure and pages 32 and 33 (direction indicator); ECE Regulation No. 7, page 22, Figure (front position (side) lamp and rear position (side) lamp reference axes), pages 23 and 37, Figures (stop lamps), and ECE Regulation 48.

In FIG. 2b, the hologram 30 is off-axis. Also this hologram 30 will preferably be transmissive.

In FIG. 2c, the hologram is arranged on the reflecting surface 13 of reflector 10. In this case, the hologram 30 may be transmissive, but is preferably reflective. Hence, in an embodiment the reflector 10 has reflector surface 13 and the 3D hologram 30 is arranged on the reflector surface 13, the 3D hologram 30 being preferably transmissive.

Therefore, the 3D hologram 30 is a transmissive hologram or is a reflective hologram.

Figure 2D:
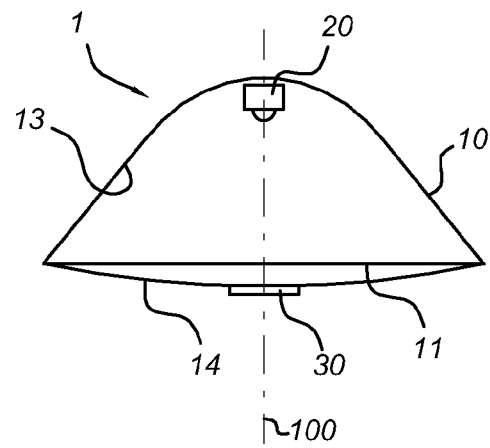

In yet another embodiment, schematically depicted in FIG. 2d, reflector opening 11 comprises an optical element 14, such as a front glass or a lens (which lens may also optionally act as a front glass). In such an embodiment, the hologram 30 may be integrated with the optical element 14 (such as a front glass). For instance, hologram 30 may be attached to or imprinted on the surface (for instance on the surface directed to the light source 20 or on the external surface of the optical element 14 (as depicted in FIG. 2d)), or may be included in the optical element 14. Again, the hologram 14 may be off-axis or on-axis, and is preferably transmissive.

Note that in all embodiments (depicted here), light source 20 may substantially emit in the direction of the reflector opening 11, but may also emit substantially indirectly (not depicted), i.e. light source 20 substantially emits in the direction of the reflector 10. For instance, referring to FIGS. 1 and 2, the light source 20 is schematically depicted as an LED. In these Figures, the light source 20 substantially emits in the direction of reflector opening 11. However, in an alternative embodiment, the emitting surface of the LED may also be directed in the direction of the reflector 10, for instance, the light source 20 may have no direct emission to the reflector opening 11, but instead all emission from the light source is incident on the reflecting surface 13, which substantially reflects the light in the direction of the reflector opening 11. In an embodiment, light source 20 is arranged to emit light substantially in the direction of the taper of the reflector 10. Hence, in an embodiment, the reflector opening 11 comprises transmissive optical element 14, and the 3D hologram 30 is arranged on (as schematically depicted) or in the transmissive optical element 14.

In a specific embodiment, the invention may also be applied to an existing lamp of a car or other vehicle. The lamp, comprising a transparent optical element 14, may be modified to the lighting unit 1 according to the invention by attaching, such as sticking, the hologram 30 to the transparent optical element 14, such as a front glass of the (car) lamp. Hence, according to a further aspect of the invention, the invention provides the use of a 3D hologram 30 for adding a holographic 3D image 31 to a beam of light 22 of a car lighting unit 1 during operation of the car lighting unit 1. This may be done without deviating from the required specification for the beam of light 22. Herein, the term "during operation" refers to the lighting unit 1 in use.

In a specific embodiment, the invention provides an embodiment of the car lighting unit 1 wherein the 3D hologram 30 is a dynamic hologram. In this way, logos, information, figures, etc., may be displayed as a function of one or more parameters selected from the group consisting of time, the input of one or more of the drivers, the crew and an optional passenger, a sensor signal, such as the distance between the car having such lighting unit and a next car behind or in front of the car having said lighting unit 1, etc. Hence, the holographic image 30 may be generated during specific (predetermined) periods of time during operation of the lighting unit 1.

Figure 3:
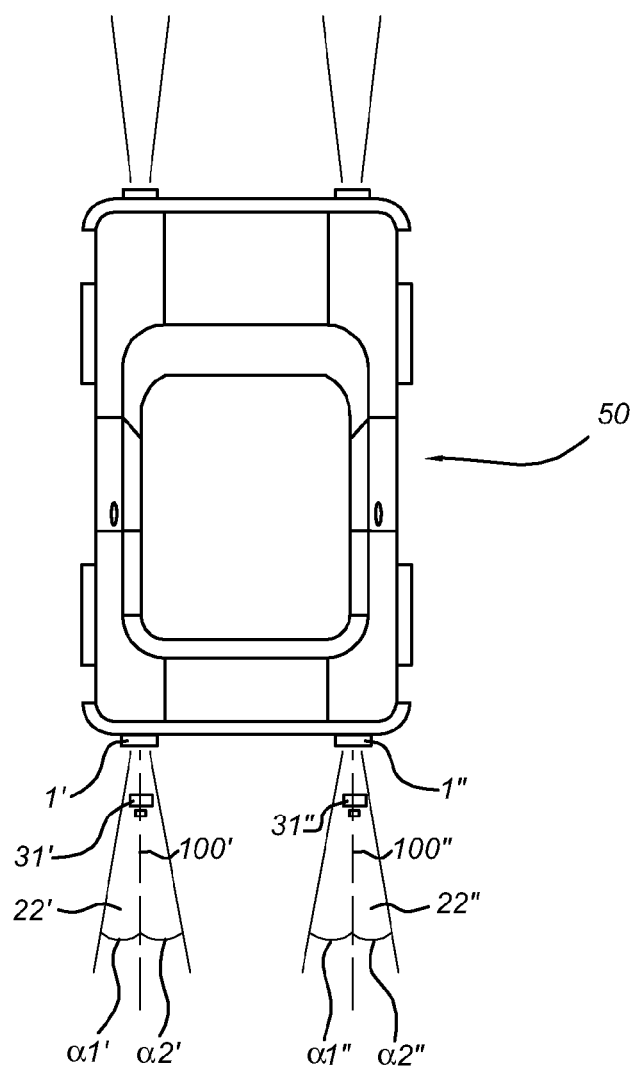
FIG. 3 schematically depicts a car having embodiments of the lighting units according to the invention, for instance, as rear stop lights.

FIG. 3 schematically depicts a top view of an embodiment of a car 50 with lighting units 1' and 1" according to the invention. The lighting units 1' and 1" are arranged to provide beams 22' and 22" respectively. Lighting units 1' and 1" may for instance be rear stop lamps. In addition to these beams 22' and 22"', in this schematic embodiment, the lighting units 1' and 1" generate holographic images 31' and 31", which, as can be seen in the Figure, are within the beam specs concerning angular distribution. The beams 22' and 22" are preferably defined according to the required specification for these lamps, and are found within angles α1', α2' and α1", α2", respectively. The angles α1', α2', may differ; likewise the angles α1", α2" may differ, see for instance also the Figures on pages 18-22 of ECE Regulation No. 6 and pages 33-38 of ECE Regulation No. 48 (direction indicators), page 23 of ECE Regulation No. 7 and pages 40-43 of ECE Regulation No. 48 (amongst others stop lamps) and other Figures and provisions in the regulations such as ECE Regulation No. 48. Hence, in addition to the prescribed beam of a direction indicator, rear light, etc., a holographic image 31 may be added during use of the lighting unit 1. Preferably, the car lighting unit 1 is constructed to generate the holographic images 31' and 31" within the beam of light 22, but in another embodiment (not depicted), the holographic image 31 may be outside the beam of light 22. Beyond angles α1', α2', α1", α2', i.e. outside the beams 22' and 22" the luminous intensity of the respective light sources is preferably equal to or less than about 0.1 times the maximum luminous intensity, as known to the person skilled in the art. Since, in a preferred embodiment, the holographic image 31 is within the beam 22, such as holographic 3D image 31' in beam 22' and holographic 3D image 31" in beam 22", the beam(s) including the holographic 3D image(s) comply with the specifications as defined in at least one of the regulations mentioned herein, while nevertheless a holographic image has been added to the beam.

Figure 4:
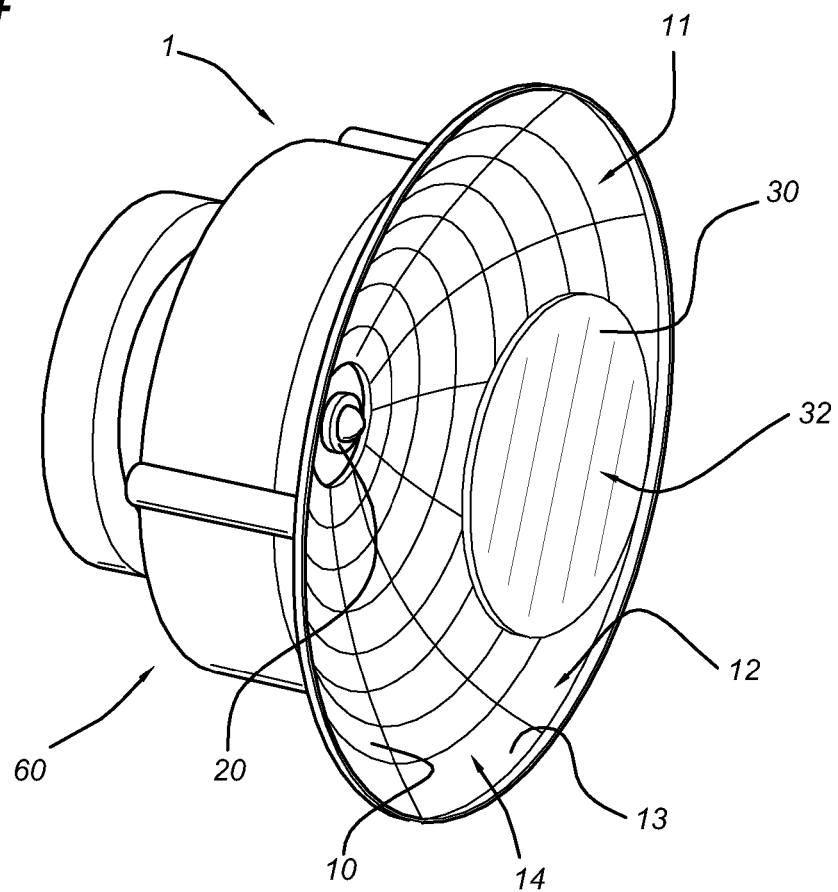
FIG. 4 schematically depicts an embodiment of the lighting unit according to the invention in a perspective view.
Figure 5:
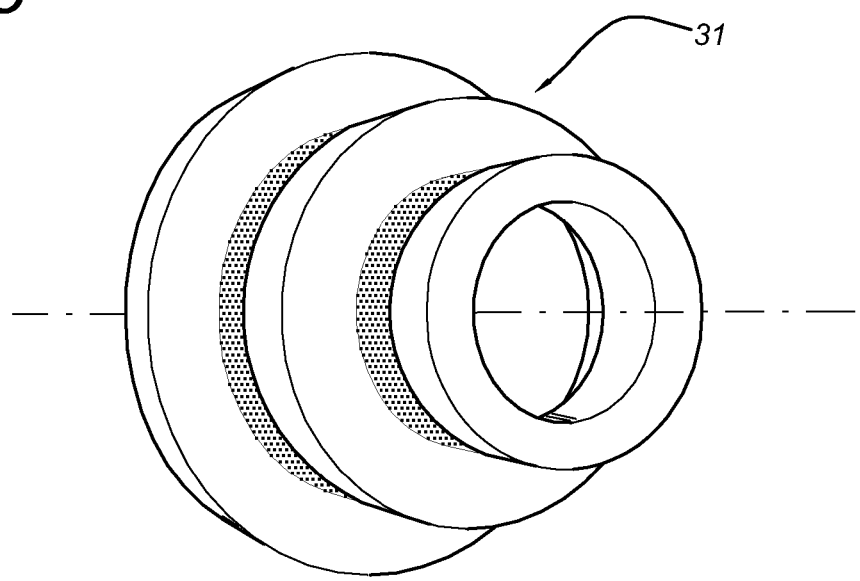
FIG. 5 schematically depicts an example of a 3D holographic image generated with an embodiment of the lamp according to the invention (for the sake of clarity, the beam is not shown).

FIG. 4 schematically shows an embodiment of the lighting unit 1 according to the invention in a perspective view. It shows the lighting unit 1 having a housing 60 for housing a reflector 10 with a reflecting surface 13. The reflector 10 has a reflector opening 11 having a reflector opening area 12. The opening 11 comprises an optical element 14, which is here, by way of example, a front glass. Attached to the optical element 14 is a hologram 30, having a hologram area 32. By way of example, FIG. 5 shows an example of a 3D holographic image 31 that can be generated.

The lighting unit 1 may further comprise a controller (not depicted) for controlling the contents of the holographic image 30, especially in case a dynamic hologram 30 is applied. The controller may be a "only hardware" system with for instance switches such as touch controls, slide switches, etc. to control the desired contents of the 3D holographic image and optionally its display time and/or frequency of displaying, depending upon the wishes of the user (driver and/or any optional passenger(s)). Further, the contents may optionally be dependent upon external parameters like time, temperature, speed, traffic density, distance to next car in front of the lighting unit 1 (especially in case of a lighting unit constructed as front light), or the next car beside the lighting unit (especially in case of a lighting unit constructed as side light), or the next car behind the lighting unit (especially in case of a lighting unit constructed as rear light), which may be measured by sensors (not depicted). The controller may be operated via a remote control. In yet another embodiment, the controller may comprise a memory, with executable instructions, an input-output unit, configured to (i) receive one or more input signals from one or more devices selected from the group consisting of (1) one or more sensors and (2) a user input device and (ii) send one or more output signals to control the contents of the 3D holographic image 31; and a processor designed to process the one or more input signals into one or more output signals based on the executable instructions.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

TABLE 1

Overview of lighting units 1 (lamps) for cars (and their trailers) according to embodiments of the invention, including regulations

| Type of lamp | Regulation (EU) | Regulation (NA) | Regulation (Japan) | embodiment preferred luminous intensity range for holographic image 31 (cd) |
|---|---|---|---|---|
| rear direction indicator lamps | ECE regulation 6 (cat 2a, 2b) | SAE J 588 | JIS D 5500 | 0.8-35 |
| front direction indicator lamps | ECE regulation 6 (cat 1, 1a, 1b) | SAE J 588 | JIS D 5500 | 3.5-80 |
| side direction indicator lamps (side turn signal lamps) | ECE regulation 6 (cat 5) | SAE J 914 | JIS D 5500 | |
| stop lamps | ECE regulation 7 (S1, S2) | SAE J 586 | JIS D 5500 | 1.2-26 |
| front position (side) lamps | ECE regulation 7 | SAE J 586 | JIS D 5500 | |
| rear position (side) lamps (tail lamps) | ECE regulation 7 | SAE J 585 | JIS D 5500 | 0.04-0.8 |
| end-outline marker lamps | ECE regulation 7 | | | |
| rear fog lamps (fog tail lamps) | ECE regulation 38 | SAE J 1319 | | 1.6-30 |
| parking lamps | ECE regulation 77 | | | |
| CHMSL | ECE regulation 7 (S3) | SAE J 1957 | JIS D 5500 | 0.5-5 |
| HMSL (rear turn lamps) | | SAE J 186, 588 | | 4-40 |
| DRL (day time running lights) | ECE regulation 87 | SAE J 2087, 593 | | 8-100 |
| reversing lamps (backup lamps) | ECE regulation 23 | SAE J 593 | JIS D 5500 Grade B1 | 1.6-16 |

The invention claimed is:

1. A car lighting unit comprising:
a reflector,
a light source arranged to generate light, wherein the reflector circumferentially surrounds the light source and defines a reflector opening, the reflector being arranged to reflect at least part of the light from the light source through the reflector opening, and
a 3D hologram disposed proximate to the light source such that, in operation, the light source generates a holographic 3D image and a separate beam of light, which beam of light providing a signaling function, and wherein the ratio of the luminous intensity related to the holographic 3D image to the total luminous intensity of the light generated by the lift source is in the range of 0.01-0.1.

2. The car lighting unit according to claim 1, wherein the reflector opening has a reflector opening area and wherein the 3D hologram has a hologram surface area and wherein the ratio of the reflector opening area to the hologram surface area is ||≦|| greater than 1.

3. The car lighting unit according to claim 1, wherein the beam of light provides a signaling function and is selected from the group consisting of rear direction indicator lamps, front direction indicator tamps, side direction indicator lamps, stop lamps, front position (side) lamps, rear position (side) lamps, end-outline marker lamps, rear fog lamps, center high mounted stop lamps, high mounted stop lamps, day time running lights, reversing lamps and parking lamps.

4. The car lighting unit according to claim 1, wherein the holographic 3D image is generated within a distance L1 from the reflector opening not exceeding about 0.1 m.

5. The car lighting unit according to claim 1, wherein the 3D hologram is a transmissive, dynamic or reflective hologram.

6. The car lighting unit according to claim 1, wherein the reflector has a reflector surface and wherein the 3D hologram is arranged on the reflector surface.

7. The car lighting unit according to claim 1, further comprising a transmissive optical element, wherein the 3D hologram is integrated within the transmissive optical element.

8. The car lighting unit according to claim 1, wherein the holographic image is seen by the viewer as being within the beam of light.

9. The car lighting unit according to claim 1, wherein, during use, the luminous intensity related to the holographic 3D image is in the range of 0.04-30 cd.

10. A car lighting unit comprising:
- a reflector,
- a single light source arranged to generate light, wherein the reflector circumferentially surrounds the light source and defines a reflector opening, the reflector being arranged to reflect at least part of the light from the light source through the reflector opening, and
- a 3D hologram disposed proximate to the light source such that, in operation, the light source generates a holographic 3D image and a separate beam of light, which beam of light providing a signaling function, and wherein the ratio of the luminous intensity related to the holographic 3D image to the total luminous intensity of the light generated by the light source is in the range of 0.01-0.1.

* * * * *